June 30, 1953     H. GOLD ET AL     2,643,663
FLUID CONTROL SYSTEM
Filed May 24, 1948
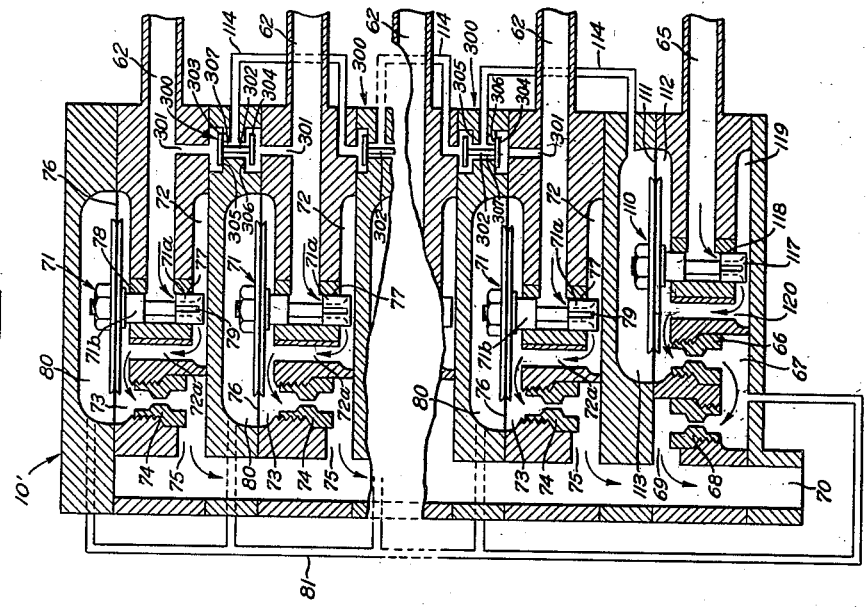
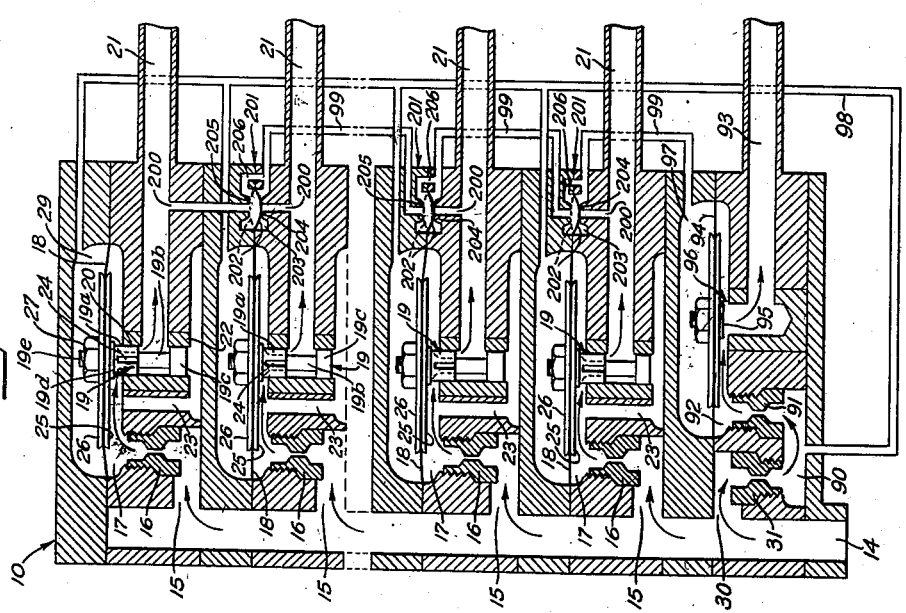
Inventors
Harold Gold &
David M. Straight Patented June 30, 1953

2,643,663

UNITED STATES PATENT OFFICE 2,643,663

FLUID CONTROL SYSTEM

Harold Gold, East Cleveland, and David M. Straight, Cleveland, Ohio

Application May 24, 1948, Serial No. 28,959

10 Claims. (Cl. 137—101)

(Granted under Title 35, U. S. Code (1952), sec. 266)

This invention relates generally to fluid control systems and more particularly concerns the metering of fluids to or from a plurality of flow passages.

The present application is a continuation-in-part of our copending application Serial No. 734,840, filed March 14, 1947.

In our aforesaid parent application we have disclosed methods and devices for maintaining a predetermined flow ratio of fluid such as liquid fuel from a common source to a plurality of outlets, or from a plurality of sources to a common outlet, irrespective of differences in discharge pressures of the outlets or sources or variations in fluid flow rates. We pointed out therein how the invention finds utility in the control of fuel distribution in gas turbine engines, or for regulating flow from a plurality of fuel tanks.

According to certain embodiments of the invention, as disclosed in the parent application, a plurality of individual flow passages are controlled to maintain a predetermined flow ratio to a pilot passage and flow through the pilot passage is modified in response to major pressure variations in any of the controlled passages by a throttle valve that communicates not only with pressure head in the controlled passages but also with the pressure head between fixed orifices in the pilot passage.

We now find that improved results are attained by having the pilot modifying communication between only the throttle valve of the pilot passage and the controlled or slave passages. Further improvement accrues also from having the pilot passage more positively adjustable by control valve means sensitively responsive through a one way check valved reference system to pressure variations in any of the slave passages. Such pressure variation adjustment of the pilot control valve means results in either an increase or decrease, as the case may be, in the pressure head between fixed orifices in the pilot passage, and thus by direct reference to control valves in the slave passages in immediate corresponding pressure adjustment in the slave passages.

An object of the present invention is to provide a fluid control system which will maintain predetermined practically perfect distribution of fluid from a single source or stream to a plurality of outlets or from a plurality of sources to a single stream or outlet irrespective of various conditions encountered in the system, such as uneven discharge pressures or variations in fluid flow rates.

Another object of the invention is to provide in a fluid control system for a plurality of individual streams operating in parallel, a control upon the flow in all of the streams based upon the flow through a pilot stream, and in addition, control in a novel manner of the pilot stream to correlate the same with variable conditions that may prevail in any of the streams under the control of the pilot stream.

A further object of the present invention is to provide improved control of a system of flow passages including a throttle valved pilot passage by subjecting the pilot throttle valve exclusively to substantial variations in pressure in the pilot controlled passages and relying upon pressure modifications thereby effected in the pilot passage to effect appropriate uniform alteration in the flow rate of the remaining passages.

It is also an object of the present invention to provide improvements in the control of a plurality of fluid passages by subjecting a pilot passage to pressure modification by subjecting it to substantial increases or decreases in pressure in any of the passages controlled thereby.

Other objects, features and advantages of the present invention will be readily apparent from the following detailed description of certain preferred embodiments thereof, taken in conjunction with the accompanying one sheet of drawings, in which:

Figure 1 is a schematic fragmental sectional view illustrating a system for equally or proportionally distributing fluid, such as liquid fuel to and through a plurality of flow passages or ducts; and Figure 2 is a schematic fragmental sectional view of a system similar to that shown in Figure 1 but arranged for proportionally or uniformly consolidating the flow through and from a plurality of streams such as may lead from individual fuel tanks of an air borne machine, or the like.

In both figures of the drawings the intermediate horizontal break denotes the omission of one or more fluid passage sections or assemblies.

In Figure 1 is shown an apparatus 10 in which liquid derived from any one or more sources under pressure is delivered to a plurality of passageways for conducting individual streams of the liquid in parallel to individual outlets or orifices (not shown) such as jet nozzles delivering to the combustion chamber of a gas turbine engine and wherein it is important that the combustion chamber receives identical amounts of liquid fuel from each nozzle despite a wide range of factors which may disturb or alter the fuel flow in one of the passages serving as a pilot, or in any of the other fluid passages.

In Figure 2 is shown substantially the reverse of the system, as illustrated in Figure 1, wherein flow from a plurality of sources, such as a plurality of fuel tanks must be coordinated and proportioned or equalized so as to assure emptying the tanks at a predetermined ratio or equally, as the case may be, in an apparatus 10'.

In the apparatus 10 of Figure 1, fluid from any suitable source such as a tank (not shown) and under pressure is delivered to a manifold passage 14 and from which the fluid flows through a plurality of distributing passages 15. In each of the passages 15 the fluid must travel through a metering jet or orifice 16 to a chamber 17 bounded on one side by a limp diaphragm 18 carrying a valve plug 19 which controls flow through an orifice 20 to a passage 21 that leads to the respective nozzle or other outlet to which the fluid is directed in the stream afforded by the described passageway. The valve plug 19 has a slotted or grooved cylindrical end portion 19a adjacent to the diaphragm 18 and snugly slidable in the orifice 20 and connected through a rod portion 19b with a second cylindrical portion 19c snugly slidable in a surrounding seat or bearing 22. A passageway 23 connects the chamber 17 with the bottom face of the cylindrical portion 19c whereby the static fuel pressure in the chamber 17 is caused to act on the entire area of the diaphragm 18. The areas of the cylindrical portions 19a and 19c exposed to the passageway 21 are equal so that the forces resulting from static fuel pressure in the passageway 21 are balanced.

The cylindrical portion 19a has grooves or slots 24 extending longitudinally thereof at spaced intervals around its periphery, and these grooves are closed at their upper ends by a head 19d on the top of the cylindrical portion. The lower ends of the grooves communicate through the bottom of the cylindrical portion to discharge into the passageway 21, and the grooves provide throttle valve passages through the orifice 20. Thus the flow rate through the orifice 20 and hence the pressure downstream from the orifice 16 is determined by the proportion of the upper end portions of the grooves 24 that is exposed to the chamber 17.

A washer 25 is bottomed on the head 19d of the plug 19 and underlies the central portion of the diaphragm 18. A second washer 26 overlies the diaphragm 18, and a nut 27 threaded on the upper end 19e of the plug clamps the washers 25 and 26 on the diaphragm and anchors the plug valve to the diaphragm.

A chamber 29 is provided above each diaphragm 18 and is separated from the chamber 17 by the diaphragm.

One of the fluid conducting branches that leads from the manifold passage 14 is utilized as a pilot, such pilot branch passage being identified at 30 and containing a pilot orifice 31 which discharges into a chamber 90 whence the fluid must pass through a jet or orifice 91 into a chamber 92 communicating through a passage 93 with a nozzle or other outlet (not shown) which may be the same as the discharge or outlet for the respective passages 21. The chamber 92 has thereacross a limp diaphragm 94 carrying a shut-off valve 95 adapted to coact with a seat 96 in the entrance or mouth to the passage 93. Thereby a chamber 97 is provided above the diaphragm as seen in Figure 1. The chamber 90 between the jets 31 and 91 has a static fluid pressure normally greater than prevails in the chamber 92 or the passage 93, as determined by the size of the jet 91, and is connected through a passaged duct or conduit 98 with each of the chambers 29.

In the operation of the apparatus as thus far described, the static fuel pressure in each of the chambers 29 is at all times substantially equal to the static fuel pressure in the chamber 90. Hence, variations in fluid pressure in the passage 93 and which variations in fluid pressure in the passage, are always reflected in corresponding variations in the pressure in the chamber 90 and by way of the passage 98 as variations in the static pressure in the chambers 29 and which affect the position of the respective diaphragms 18, decreases in pressure permitting the diaphragms 18 to move into the respective chambers 29 and thus permitting the fluid pressure in the respective chambers 17 to act on the diaphragms to open the valves 19 correspondingly. On the other hand, increases in pressure in the chambers 29 act on the respective diaphragms 18 to force the same in opposition to fluid pressure in the chambers 17, tending to close the valves 19 and thus restrict flow to the respective passages 21.

Any change in resistance to fluid flow in any of the discharge passages 21 will be transmitted back as a change in pressure in the respective chamber 17 which feeds the passage 21 thus affected. This change in pressure causes the diaphragm 18 associated with such passage 21 to alter the position of the plug valve 19, thus varying the free area through the slots 24 thereof until the pressure balance between the chamber 17 and the chamber 90 is restored. The static pressures on the downstream side of each metering jet or orifice 16 is therefore maintained equal. Since the manifold passage 14 is relatively large, the effect of fluid friction is negligible and all of the branch metering orifices 16 receive the fuel at the same static pressure. The static pressure drops across the metering jets or orifices 16 are therefor maintained equal, independently of differences in resistance to fluid flow in any of the passages 21.

When it is desired to maintain equal rates of flow in each of the passages 21, as in the application of this system to a multi-jet gas-turbine engine, the branch metering orifices 16 are provided with equal orifice apertures. In other applications where it may be desired to maintain a definite ratio, other than unity, between the rates of flow in the passages 21, it is practicable to do so by using branch metering jets or orifices 16 which have openings therethrough sized for giving the desired flow ratio.

According to the present invention, not only are the branch passages 21 influenced and maintained in predetermined ratio or unity of fluid flow with the pilot passage 93, but consequential variations in pressure in the respective passages 21 are reflected at all times in control of all of the other companion passages 21 and the pilot passage 93 to vary the pressures therein correspondingly. This is true of both increases or decreases in pressure in the streams in the respective passages 21. Herein this is accomplished by having the static pressure chamber 97 in check valved communication with each of the passages 21 by way of a duct 99. A branch duct 200 leads from each of the respective passages 21 to the duct passage 99. In control of communication between each of the branches 200 and the duct 99 is a respective check valve 201 which comprises a limp diaphragm 202 which may conveniently be an extension of the respective limp diaphragm 18 across a chamber 203 in each instance. The check valve diaphragm 202 is disposed medially between and engageable with equal facility with spaced, opposed valve seats 204 and 205 extending into the chamber 203. The valve seats 204 are situated at the mouths of the ducts 200, and the valve seats 205 afford communication for the end portions of the duct 99 which lead from or to the chamber 203 except with respect to the uppermost valve seat 205 as seen at the top of Figure 1 and through which communicates the duct 200 from the uppermost passage 21. In each instance, a by-pass passage 206 connects each side of the limp diaphragm 202 in the chamber 203.

The diaphragm 202 seeks the seat 204 or 205, which offers the lower pressure, remaining inert when the pressures are equal or substantially equal. Thus, should there be a consequential pressure increase in one of the passages 21, the associated diaphragm valve 202 moves away from the seat 204 of the duct 200 leading from such passage 21 and seeks the opposite seat 205, thereby transmitting the increased pressure from the affected passage 21 by way of the duct 99 to the pilot chamber 97. This drives the diaphragm 94 with the valve 95 into restricting relation to its seat 96 whereby to throttle flow through the pilot passage 93 and develop a back pressure which is reflected in the chamber 90. The increased pressure is transmitted through the duct 98 to the static throttle valve pressure chambers 29 for effecting a throttled flow condition in each of the passages 21 corresponding to the diminished fluid flow prevailing in the passage 21 in which the pressure variation originated.

By the present arrangement, the pressure increase in any of the passages 21 is reflected only in the chamber 97 of the pilot control stream throttle valve assembly and not in any of the other branch streams 21 since the respective check valves 201 associated with such other stream passages 21 will block the ducts 200 leading therefrom where such passages intervene between the pilot passage 93 and the passage 21 in which the variation occurs, and the check valve 201 associated with the affected stream 21 prevents transmission of the pressure to any passage 21 therebeyond. For example, tracing the effect of an increase in pressure in the passage 21 at the remotest passage 21 at the top of Figure 1, the increased pressure is reflected through the terminal portion of the duct 99 leading from the upper passage 21, drives the diaphragm 202 of the associated check valve 201 against the seat 204 at the mouth of the branch passage 200 of the next succeeding branch 21 and then travels by way of the respective by-pass passage 206 onward through the duct 99, repeating the performance at each of the check valves 201 until the pressure reaches the chamber 97. In any instance, even though there should be a pressure increase in one of the succeeding passages 21 simultaneously with a greater increase in a preceding passage 21 (compare the topmost passage 21 with the third branch from the top of Figure 1) the greater pressure will be passed on to the chamber 97 and all of the passages 21 and 93 thus brought under the control variation initiated by the greater pressure. Should the increased pressure originate in any of the intermediate passages 21, the diaphragm valve 202 associated with the check valve 201 companion to such intermediate passage will move from the full line position indicated in Figure 1 to the dash line position, thus blocking travel of the pressure to the passages 21 more remote from the pilot passage 93 but directing the pressure in one direction to the pilot chamber 97. Thus, the highest pressure in any of the passages 21 is transmitted positively in one direction only to the pilot chamber 97 so that the pilot at all times maintains control of the system.

It may also be noted that in the event of a reduction in pressure in the passage 21 that previously was at a higher pressure than any other passage 21 to a pressure below that existing in another passage 21, such pressure reduction will be reflected in a control response in the system for maintaining the equality of flow or predetermined flow ratio of the system. Thus, in the event of any such pressure drop, there is a pressure bleed from the pilot chamber 97 by way of the duct 99 to the affected passage 21, which causes further opening of the pilot valve 95 by deflection of the diaphragm 94 into the chamber 97, and thus a drop in pressure in the chamber 90 which is promptly reflected in each of the throttle valve static pressure chambers 29.

In the event that the pressure in the passage 93 is higher than the pressure in any passage 21, the pilot valve 95 moves to wide-open, thereby still maintaining the pressure in the chamber 92 equal to the highest pressure existing at any of the discharge points of the system.

It will thus be apparent that at all times not only are the several passages 21 maintained under individual pressure responsive throttle control, but they are maintained under pilot pressure control, and also under mutual pressure variation control, the latter being, of course, reflected through the pilot control.

Having reference now to the form of Figure 2 wherein equality of flow or predetermined flow ratio is maintained from a plurality of passages 62 leading from separate fluid sources such as fuel tanks in an air borne machine such as an airplane or the like, are arranged in parallel with a pilot passage 65 which may also lead from a similar individual fluid source. The arrangement is such that the flow through each of the passages 62 is maintained equal or in predetermined ratio to the flow through the passage 65, and also variations in the fluid pressure in any of the passages 62 are effective to adjust the pressures in all of the other flow passages.

The pilot passage 65 has a fixed pilot regulator jet or orifice 66 discharging into a chamber 67 of the apparatus 10′, and fluid passes from the chamber 67 through a pilot metering jet or orifice 68 into a branch passage 69 emptying into a manifold passage 70.

Each of the passages 62 is controlled by a throttle valve 71 for discharge into a chamber 72 which communicates by way of a passage 72a with a pressure chamber 73. From the chamber 73 fluid passes by way of a metering jet or orifice 74 into a branch passageway 75 that leads into the manifold passage 70.

The chamber 73 is bounded on one side by a limp diaphragm 76 connected to the throttle valve 71 by washers and the like in similar fashion as explained in connection with the throttle valve structures 19 of Figure 1. However, in the present instance the throttle valve 71 includes cylindrical portions 71a and 71b, respectively, slidably seated in an orifice 77 and a passage 78. The cylindrical portion 71a has slots 79 which meter flow from the passage 62 to the passage 72 in amounts determined by the extent of exposure of the ends of the slots to the passage or chamber 72. The valves 71 are balanced in the same manner as the valves 19, described in connection with Figure 1. That is, the pressure of fluid upstream from the respective orifice 74 is reflected by movements of the diaphragm 76 and the throttle valve 71 to determine the position of the metering cylindrical portion 71a of the valve.

A static pressure chamber 80 is provided above each of the diaphragms 76 and such chamber is connected by a conduit or duct passage 81 with the pilot chamber 67.

Fluid under pressure from the duct 65, whether such pressure is effected by positive pressure upstream in the passage 65 or by suction in the manifold 70, being immaterial, flows through the jet or orifice 66 into the chamber 67 and the metering jet or orifice 68 and develops fluid pressure in the chamber 67. This pressure in the chamber 67 is transmitted through the passage 81 to each of the throttle chambers 80. The pressure in the chambers 80 acts on the diaphragms 76 to open the throttle valves 71, but this action is resisted by the pressure in the chambers 73 on the other sides of the diaphragms. The pressure in each chamber 73 will change whenever the pressure drop across the branch metering jet or orifice 74 changes. Since each of the branch metering jets 74 discharges into the same manifold passage 70 as the pilot metering jet or orifice 68, which maintains pressure in the chamber 67, it is evident that any variation in the pressure drop across the pilot regulator jet or orifice 66 will immediately be reflected in a pressure change in the chambers 80, thereby changing the setting or position of the respective throttle valves 71 and maintaining a constant flow ratio in the passages 62 and 65. If the sizes of the metering orifices are equal, the flow rate in each passage will be identical as determined by the pilot passage 65. The system of Figure 2, therefore, operates substantially in reverse relation to the system of Figure 1.

In addition to control of the system responsive to variations in the pilot stream of the passage 65, means are provided for mutual responsiveness of the several passages 62 to variations occurring in any of the passages, as reflected through control of the pilot stream. To this end, the pilot passage 65 is equipped with a throttle valve 110 controlled by a limp diaphragm 111 between a chamber 112 and a chamber 113. The chamber 113 is connected by a duct passageway 114 with all of the fluid passages 62.

The pilot throttle valve 110 is preferably similar to the passage throttle valves 71, and includes a longitudinally slotted metering plug portion 117 which is slidable in an orifice 118 whence the metered fluid enters a passage chamber 119 and escapes by way of a passage 120 to the throttle valve chamber 112 for influencing the diaphragm 111 and thus the action of the throttle valve 110.

By having the pilot throttle valve chamber 113 communicating with the passages 62, the lowest pressure in any of the passages 62 will be reflected in the pilot stream to control all of the passages.

In order to assure that the lowest pressure in the passages 62 will be transmitted in one direction only to the chamber 113, check valves 300 are interposed at the juncture of the duct 114 and respective branch passages 301 leading from the passages 62 to the duct 114.

In the present instance each of the check valves 300 comprises a spool type member 302 carrying valve heads 303 and 304 at its respective opposite ends. Valve seats 305 and 306 for the valve heads 303 and 304, respectively, are disposed at opposite ends of a cross duct 307 into which the duct 114 opens between the valve heads 303 and 304.

Normally the check valve member 302 will move away from the greater pressure to block escape of the pressure past the respective valve seat 305 or 306 to the duct 114 and thus eventually to the throttle static pressure chamber 113. As a result, only low pressure exposure of the chamber 113 will prevail. Hence, the lowest pressure in any of the passages 62 will be reflected in the throttle chamber 113, causing the diaphragm 111 to move into the chamber 113 and throttle flow through the pilot passage 65, causing a drop in pressure in the chamber 67 and corresponding drop in all of the throttle valve chambers 80 and thus return the system to balance or the predetermined ratio for which it may be adjusted.

By way of illustration in Figure 2, the check valve 300 associated with the passage 62 nearest the throttle passage 65 is shown as displaced to close the valve seat 306 because the pressure has dropped in a passage 62 more remote from the pilot passage 65 so that the greater pressure in the adjacent passage 62 acting on the associated check valve 300 causes the check valve member 302 to be moved under the influence of the greater pressure to block escape of the pressure while at the same time opening the controlled section of the duct 114 for exposure through the duct 114 of the chamber 113 to the pressure drop from the low pressure passage 62.

In the event that the pressure in the passage 65 is lower than the pressure existing in any passage 62, the throttle valve 110 moves to wide-open, thereby still maintaining the pressure in the chamber 112 equal to the lowest pressure existing in any of the source points of the system.

From the foregoing it will be apparent that the present invention provides a highly advantageous method and apparatus for controlling the flow of a plurality of parallel streams, where the streams are all flowing to different discharge points or where the streams all originate at different sources and flow to a common discharge point or to separate discharge points. Not only are the streams individually throttled for uniformity of flow therethrough but they are collectively controlled by a pilot stream, and are mutually responsible for controlling the flow system as reflected through the pilot. The invention therefore affords a highly sensitive control for plural streams and which control is responsive to a great variety of conditions throughout the system and within a wide range of variable factors.

It will, of course, be understood that various details in the present disclosure may be varied through a wide range without departing from the principles of this invention and it is, therefore, not the purpose to limit the patent granted hereon otherwise than necessitated by the scope of the appended claims.

The invention described herein may be manufactured and used by or for the Government of the United States of America for governmental purposes without the payment of any royalties thereon or therefor.

We claim as our invention:

1. In combination in apparatus for controlling the flow of fluid through a plurality of fluid passages, pressure-sensitive means for individually controlling each of said passages, a single pilot passage, spaced pressure controlling orifice means in said pilot passage defining therebetween a static pressure head, means effecting communication between said static pressure head and each of the pressure-sensitive control means for said plurality of passages for coordinating the flow through said plurality of passages with the flow through said pilot passage, a pressure-sensitive valve for adjusting the flow through said pilot passage, and means effecting communication with said pressure-sensitive valve and each of said plurality of passages to render said pressure-sensitive valve responsive to the greatest departure in pressure in any of said plurality of passages from the relative pressure condition established in said plurality of passages as a result of said coordinating of flow therein with flow through said pilot passage.

2. In apparatus of the character described, a plurality of separate fluid flow slave passages, an orifice in each of said passages, means defining a chamber in each of said passages, a separate throttle valve in and controlling flow through each of said passages, each of said valves having a limp diaphragm operator dividing the chamber in the associated passage into a dynamic pressure portion and a static pressure portion, the passages having portions thereof communicating in fluid flow relation with said dynamic pressure portions of the respective chambers so that the pressure of the fluid flowing through the respective passages is effective in the dynamic pressure portions of the chambers to operate the respective diaphragm for controlling the associated throttle valves, a pilot passage having two orifices therein in series defining a pressure head area therebetween, fluid duct means effecting communication of said pressure head area with the static pressure portions of said chambers, a throttle valve in control of the pilot passage, pressure-responsive means for actuating said pilot passage throttle valve, and means for selectively effecting communication between said pressure responsive means and that one of said slave passages in which the pressure has departed the greatest amount in a predetermined direction from a pressure as determined by the communication of said pressure head area with the static pressure portions of said chambers whereby to adjust the pilot passage throttle valve and thereby adjust the pressure in said pressure head area for correspondingly adjusting all of the remaining slave passages substantially conformable to said one slave passage.

3. In apparatus for controlling the flow of fluid through a plurality of passages to maintain a predetermined flow ratio in said passages, one of said passages serving as a pilot and having a pair of restricted orifices therein affording a pressure head therebetween, the remaining passages being in slave relation to said pilot passage and each having a metering orifice therein determinative of the fluid flow through the passage, each of said slave passages having a separate throttle valve therein spaced from the metering orifice in such slave passage for controlling pressure fluctuations therein and each of said throttle valves including a diaphragm actuator exposed on one side to the dynamic pressure of fluid within the associated passage and having a static pressure area on the other side of the diaphragm actuator, the static pressure areas of all of said throttle valve actuators being in pressure communication with said pressure head for coordinating the operation of the throttle valves and thereby the flow through said slave passages responsive to variations in said pressure head, said pilot passage having a diaphragm-controlled throttle valve therein one side of which is responisve to the dynamic pressure of fluid flowing through the pilot passage and the other side of which is exposed to a static pressure chamber, and means having communication with only said static pressure chamber insofar as the pilot passage is concerned and with each of said slave passages for rendering said static pressure chamber sensitive to the pressure condition in that slave passage which has departed the greatest amount in a predetermined direction from the coordinated flow condition established in said slave passages as aforesaid, whereby to effect adjustment of said pilot passage throttle valve and thus condition the pressure in said pressure head for correspondingly effecting readjustment of all of the throttle valves in the remaining slave passages.

4. In apparatus for controlling the flow of fluid through a plurality of passages to maintain a predetermined flow ratio in said passages, one of said passages serving as a pilot and having a pair of restricted orifices therein affording a pressure head therebetween, the remaining passages being in slave relation to said pilot passage and each having a metering orifice therein determinative of the fluid flow through the passage, each of said slave passages having a separate throttle valve therein spaced from the metering orifice in such slave passage for controlling pressure fluctuations therein and each of said throttle valves including a diaphragm actuator exposed on one side to the dynamic pressure of fluid within the associated passage and having a static pressure area on the other side of the diaphragm actuator, the static pressure areas of all of said throttle valve actuators being in pressure communication with said pressure head for coordinating the operation of the throttle valves and thereby the flow through said slave passages responsive to variations in said pressure head, said pilot passage having a diaphragm-controlled throttle valve therein one side of which is responsive to the dynamic pressure of fluid flowing through the pilot passage and the other side of which is exposed to a static pressure chamber, and means having communication with only said static pressure chamber insofar as the pilot passage is concerned and with each of said slave passages for rendering said static pressure chamber sensitive to the pressure condition in that slave passage which has departed the greatest amount in a predetermined direction from the coordinated flow condition established in said slave passages as aforesaid, whereby to effect adjustment of said pilot passage throttle valve and thus condition the pressure in said pressure head for correspondingly effecting readjustment of all of the throttle valves in the remaining slave passages, said communication means including a passage leading to said pilot static pressure chamber and with a branch leading to said communication means passage from each of said slave passages and having a pressure-sensitive check valve in control of each branch.

5. In combination in control apparatus for maintaining a predetermined fluid flow ratio in a plurality of fluid passages wherein there is concurrent fluid flow created by differential line pressure in the several passages, one of said passages serving as a pilot and the remaining passages being in slave relation to the pilot passage, respective pressure responsive means for individually controlling the passages, means comprising a duct leading from the pilot passage at one side of the control means therein and operatively communicating with said control means in the slave passages for adjustably actuating the latter responsive to pressure variations in the pilot passage for thereby maintaining substantially a predetermined flow ratio in the slave passages relative to the pilot passage, and means including a duct communicating at one terminus with the pilot passage controlling means and having respective branch ducts leading thereto from said slave passages, said communicating duct having respective check valve means at said branch ducts operatively responsive to predetermined pressure differential in one of said slave passages relative to the other slave passages for selectively effecting communication through said communicating duct with the pilot passage controlling means for adjusting the latter to modify the pilot passage pressure and thereby effecting adjustment of the slave passage controlling means through said duct leading to said slave passage controlling means.

6. Apparatus as defined in claim 5, wherein said check valve means comprise limp diaphragms which remain inactive during the predetermined fluid flow ratio conditions in said passages but act under excess pressure in the respectively associated slave passage to block backsurge of excess pressure through said communicating duct and limiting excess pressure flow through said communicating duct toward said terminus.

7. Apparatus as defined in claim 5 wherein said check valves comprise spool-type members which remain inactive during predetermined fluid flow ratio conditions in said slave passages, but act respectively under deficient pressure in said communicating duct originating from the respectively associated slave passage to block escape of pressure through the communicating duct away from said terminus but limiting reference of said deficient pressure toward said terminus for corresponding adjustment of the pilot valve controlling means.

8. In a multi-passage fluid control system wherein a predetermined fluid flow ratio must be maintained in all of the passages irrespective of variation in flow rate, and wherein each of the passages communicates at its opposite ends with respective pressure regions in differential pressure relationship and each passage contains respective means for individually controlling flow therethrough to maintain a predetermined relative flow ratio in the passages, one of the passages serving as a pilot and having a pair of spaced orifices therein developing a pressure head zone therebetween which is connected through duct means with the control means of each of the remaining passages which are thus placed in slave relation to the pilot passage; the improvement which comprises the pilot passage control means being a pressure-sensitive throttle valve, and a duct having a terminus connected with said throttle valve and communicating with each of the slave passages, said duct having at each of the slave passages a respective check valve structure comprising in each instance a balanced diaphragm and opposed valve seats selectively engageable by the diaphragm, one of said seats in each instance communicating with the associated slave passage and the other of said seats being disposed directly in the adjacent portion of the flow passage in said duct, whereby upon the development of a fluid pressure in any of said slave passages in excess of pressure determined by said pilot passage control of said slave passages will drive the diaphragm associated with said one passage against the associated valve seat in the duct to direct pressure referenced through the duct toward said terminus, the diaphragms of the check valve structures of slave passages communicating with said duct intermediate said one slave passage and said terminus being driven by said excess pressure against the respectively associated passage communicating valve seats to block direct reflection of said excess pressure in said intermediate slave passages.

9. In apparatus including a plurality of fluid passages, one of said passages serving as a pilot for maintaining the other passages in slave relation to said pilot passage, each of the passages including a pressure-responsive throttle valve therein for controlling flow therethrough, means for controlling the slave passages respective to pressure fluctuations in the pilot passage comprising a duct connecting a portion of the pilot passage with each of said pressure-responsive throttle valves in the slave passages, and mean for controlling flow through the pilot passage responsive to pressure fluctuation in any one of said slave passages causing departure from a predetermined fluid flow ratio, comprising a duct communicating with each of said slave passages but with respect to the pilot passage communicating solely with the throttle valve therein for adjustment of the pilot throttle valve in accordance with the pressure departure in said one slave passage to thereby conform the throttle pilot passage pressure to said departure and thus effect readjustment of the slave passage controlling throttle valve to return the passages to a predetermined fluid flow ratio under the control of the pilot passage.

10. In a flow control system for maintaining proportional flow through a plurality of slave passages wherein one of said slave passages communicates at its opposite ends with respectively first and second pressure regions in differential pressure relation to effect fluid flow in one direction between said pressure regions for all of said passages, said slave passages having therein respective metering orifice means, all of said orifice means on one side being subjected to the pressure conditions prevailing in the first pressure region; pressure loaded pressure control means in each slave passage on the other side of said orifice means therein arranged to control the pressure at the other side of such orifice means in accordance with the loading pressure; means for applying a common loading pressure to each of said pressure control means for effecting proportional flow through said slave passages, comprising a pilot passage communicating with said first pressure region, metering orifice means in said pilot passage, one side of said pilot orifice means being subjected to the pressure conditions prevailing in said first pressure region, means providing on the other side of said pilot orifice means a zone in which the pressure varies with flow through said pilot passage, and a loading pressure duct establishing communication between said zone and each of said pressure control means; the combination with said pressure control means and said pressure zone of means for varying the pressure in said zone in accordance with the pressure in any slave passage in which the pressure control means is caused by line pressure factors in such slave passage to depart in a predetermined direction from aid common loading pressure adjustment, comprising variable restriction means in said pilot passage between said zone and the other end of said pilot passage and including a pressure actuator, interconnecting conduit means connecting each of said slave passages on the other side of its metering orifice means with the pressure actuator, and respective check valve means associated with said interconnecting conduit means and being operable to open selectively communication between the pressure actuator and the slave passage in which the pressure departs in said predetermined direction from the common loading pressure adjustment, to substantially proportionally readjust the pressure in said zone and thus effect corresponding readjustment of the loading pressures in all of the slave passages.

HAROLD GOLD.
DAVID M. STRAIGHT.

References Cited in the file of this patent

UNITED STATES PATENTS

| Number | Name | Date |
|---|---|---|
| 1,452,265 | Collins | Apr. 17, 1923 |
| 1,590,275 | Bayless | June 29, 1926 |
| 2,313,797 | Bailey | Mar. 16, 1943 |
| 2,430,264 | Wiegand et al. | Nov. 4, 1947 |
| 2,606,066 | Thompson | Aug. 5, 1952 |
| 2,621,719 | Eaton et al. | Dec. 16, 1952 |

FOREIGN PATENTS

| Number | Country | Date |
|---|---|---|
| 577,132 | Great Britain | of 1946 |
| 526,869 | Germany | of 1931 |